(12) United States Patent
Kyung

(10) Patent No.: US 12,457,066 B2
(45) Date of Patent: Oct. 28, 2025

(54) BEAM MANAGEMENT METHOD AND ASSOCIATED COMMUNICATIONS APPARATUS

(71) Applicant: MediaTek Singapore Pte. Ltd., Singapore (SG)

(72) Inventor: Gyu Bum Kyung, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 630 days.

(21) Appl. No.: 17/796,680

(22) PCT Filed: Feb. 2, 2021

(86) PCT No.: PCT/SG2021/050051
§ 371 (c)(1),
(2) Date: Aug. 1, 2022

(87) PCT Pub. No.: WO2021/158175
PCT Pub. Date: Aug. 12, 2021

(65) Prior Publication Data
US 2023/0059966 A1 Feb. 23, 2023

Related U.S. Application Data

(60) Provisional application No. 62/969,205, filed on Feb. 3, 2020.

(51) Int. Cl.
*H04L 5/00* (2006.01)
*H04B 7/06* (2006.01)
(52) U.S. Cl.
CPC .......... *H04L 5/001* (2013.01); *H04B 7/06968* (2023.05); *H04L 5/0051* (2013.01)
(58) Field of Classification Search
CPC .............................. H04L 5/001; H04L 5/0051
See application file for complete search history.

(56) References Cited

U.S. PATENT DOCUMENTS 10,952,231 B2 * 3/2021 Liou ..................... H04W 76/27
11,949,485 B2 * 4/2024 Koskela ............ H04W 74/0833
(Continued)

FOREIGN PATENT DOCUMENTS

CN 109803427 A 5/2019
CN 111788857 A 10/2020
(Continued)

OTHER PUBLICATIONS

LG Electronics, Discussion on multi-beam based operations and enhancements, 3GPP TSG RAN WG1 Meeting #99, R1-1912270, Reno, USA, Nov. 18-22, 2019, pp. 1-11, XP051823335, Nov. 18, 2019.

(Continued)

*Primary Examiner* — Gbemileke J Onamuti
(74) *Attorney, Agent, or Firm* — Winston Hsu

(57) ABSTRACT

A method for beam management for a communications apparatus communicating with a network device in a wireless network, comprising: determining whether there is any component carrier (CC) recorded in a predetermined CC list with a predetermined resource identifier upon receiving information regarding a Transmission Configuration Indicator (TCI) state of a reference signal (RS) resource in a target CC; and when there is one or more CCs recorded in the predetermined CC list with the predetermined resource identifier, applying a setting of a predetermined Quasi Co-Location (QCL) type indicated by the TCI state of the RS resource in the target CC to the one or more CCs recorded in the predetermined CC list with the predetermined resource identifier.

14 Claims, 5 Drawing Sheets

(56) References Cited

U.S. PATENT DOCUMENTS

| | | |
|---|---|---|
| 2011/0249578 A1 | 10/2011 | Nayeb Nazar |
| 2019/0239245 A1 | 8/2019 | Davydov |
| 2020/0007292 A1 | 1/2020 | Huang |
| 2021/0044403 A1* | 2/2021 | Zhang .................. H04L 5/0035 |
| 2021/0243750 A1* | 8/2021 | Ryu ..................... H04B 7/2643 |

FOREIGN PATENT DOCUMENTS

| | | |
|---|---|---|
| CN | 112087291 A | 12/2020 |
| WO | 2018/232090 A1 | 12/2018 |

OTHER PUBLICATIONS

Vivo, Remaining issues on multi-beam transmission, 3GPP TSG RAN WG1 #99, R1-1912040, Reno, USA, Nov. 18-22, 2019, XP051819923, Nov. 18, 2019.

Nokia et al., Enhancements on Multi-beam Operation, 3GPP TSG RAN WG1 #99, R1-1912720, Reno, USA, Nov. 18-22, 2019, XP051820170, Nov. 18, 2019.

ZTE, Enhancements on multi-beam operation, 3GPP TSG RAN WG1 Meeting #98bis, R1-1910285, Chongqing, China, Oct. 14-20, 2019, XP051808479, Oct. 14, 2019.

LG Electronics, Feature lead summary#5 of Enhancements on Multi-beam Operations, 3GPP TSG RAN WG1 Meeting #98bis, R1-1911593, Oct. 14-20, 2019, pp. 1-28, Chongqing, China.

ZTE, Enhancements on multi-beam operation, 3GPP TSG RAN WG1 Meeting #98, R1-1908192, Aug. 26-30, 2019, pp. 1-26, Prague, CZ.

LG Electronics, Feature lead summary of Enhancements on Multi-beam Operations, 3GPP TSG RAN WG1 Meeting #99, R1-1912277, Nov. 18-22, 2019, pp. 1-35, Reno, USA.

"International Search Report" mailed on Apr. 26, 2021 for International application No. PCT/SG2021/050051, International filing date:Feb. 2, 2021.

* cited by examiner

BEAM MANAGEMENT METHOD AND ASSOCIATED COMMUNICATIONS APPARATUS

CROSS REFERENCE TO RELATED APPLICATIONS

This application claims the benefit of U.S. Provisional Application No. 62/969,205 filed Feb. 3, 2020, the entirety of which is incorporated by reference herein.

BACKGROUND

The fifth generation (5G) communication standard is the next generation communication standard of LTE (Long Term Evolution) and LTE-Advanced. 5G NR Release 15 specifies frequency use up to 52.6 GHz with up to 400 MHz bandwidth per carrier, and aggregation of multiple carriers for up to 800 MHz channel bandwidth. Due to such high frequency application, for example, at millimeter-wave (mmWave) frequencies, usage of one or more transmitting or receiving "beam" has been introduced in 5G NR standard. However, operating at millimeter-wave (mmWave) frequencies brings new challenges in path loss, blockage, and signal propagation. To overcome these issues, beam steering is a key technology. In addition, the 5G NR standard is designed to adapt to different beam-forming architecture and deployment scenarios.

Since beam-forming is a key feature in the 5G NR standard, how to efficiently manage the beams is a topic worthy to be concerned.

SUMMARY

According to an embodiment of the invention, a method for beam management for a communications apparatus communicating with a network device in a wireless network, comprising: determining whether there is any component carrier (CC) recorded in a predetermined CC list with a predetermined resource identifier upon receiving information regarding a Transmission Configuration Indicator (TCI) state of a reference signal (RS) resource in a target CC; and when there is one or more CCs recorded in the predetermined CC list with the predetermined resource identifier, applying a setting of a predetermined Quasi Co-Location (QCL) type indicated by the TCI state of the RS resource in the target CC to the one or more CCs recorded in the predetermined CC list with the predetermined resource identifier.

According to another embodiment of the invention, a communications apparatus, comprising a radio transceiver transmitting or receiving wireless signals in a wireless network and a processor coupled to the radio transceiver and configured to perform operations comprising: determining whether there is any component carrier (CC) recorded in a predetermined CC list with a predetermined resource identifier upon receiving information regarding a Transmission Configuration Indicator (TCI) state of a reference signal (RS) resource in a target CC; and when there is one or more CCs recorded in the predetermined CC list with the predetermined resource identifier, applying a setting of a predetermined Quasi Co-Location (QCL) type indicated by the TCI state of the RS resource in the target CC to the one or more CCs recorded in the predetermined CC list with the predetermined resource identifier.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
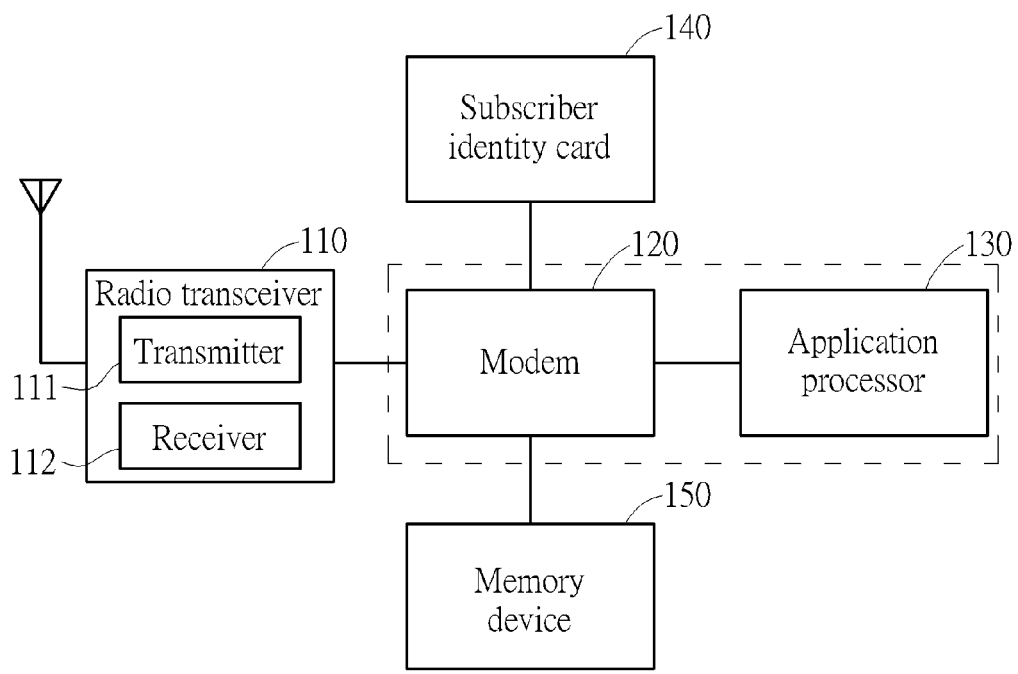
FIG. 1 shows an exemplary block diagram of a communications apparatus according to an embodiment of the invention.

FIG. 1 shows an exemplary block diagram of a communications apparatus according to an embodiment of the invention. The communications apparatus 100 may be a portable electronic device, such as a Mobile Station (MS, which may be interchangeably referred to as User Equipment (UE)). The communications apparatus 100 may comprise at least an antenna module comprising at least one antenna, a radio transceiver 110 configured to transmit or receive wireless signals in a wireless network, a modem 120, an application processor 130, a subscriber identity card 140, and a memory device 150. The radio transceiver 110 may comprise a receiver 112 configured to receive wireless signals from an air interface via the antenna module and a transmitter 111 configured to transmit wireless signals to the air interface via the antenna module, and the radio transceiver 110 may be further configured to perform radio frequency (RF) signal processing. For example, the receiver 112 may convert the received signals into intermediate frequency (IF) or baseband signals to be processed, or transmitter 111 may receive the IF or baseband signals from the modem 120 and convert the received signals into wireless signals to be transmitted to a network device in the wireless network (e. g. a cellular network or a wireless local access network). According to an embodiment of the invention, the network device may be a cell, a node B, an evolved node B (eNB), a g node B (gNB), a base station, a Mobility Management Entity (MME), an Access and Mobility Management Function (AMF) device, an access point (AP), etc., at the network side and communicating with the communications apparatus 100 via the wireless signals.

The transmitter 111 and the receiver 112 of the radio transceiver 110 may comprise a plurality of hardware devices to perform RF conversion and RF signal processing. For example, the transmitter 111 and/or the receiver 112 may comprise a power amplifier for amplifying the RF signals, a filter for filtering unwanted portions of the RF signals and/or a mixer for performing frequency conversion. According to an embodiment of the invention, the radio frequency may be, for example, the frequency of any specific frequency band for a LTE system, or the frequency of any specific frequency band for a 5G NR system, the frequency of any specific frequency band for a WiFi system, etc.

The modem 120 may be configured to handle corresponding communications protocol operations and processing the IF or baseband signals received from or to be transmitted to the radio transceiver 110. The application processor 130 is configured to run the operating system of the communications apparatus 100 and run application programs installed in the communications apparatus 100. In the embodiments of the invention, the modem 120 and the application processor 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a SIM, USIM, R-UIM or CSIM card, or the like and may typically contain user account information, an International Mobile Subscriber Identity (IMSI) and a set of SIM application toolkit (SAT) commands and may provide storage space for phone book contacts. The memory device 150 may be coupled to the modem 120 and application processor 130 and may store system data or user data.

It should be noted that, in order to clarify the concept of the invention, FIG. 1 presents a simplified block diagram in which only the elements relevant to the invention are shown. For example, in some embodiments of the invention, the communications apparatus may further comprise some peripheral devices not shown in FIG. 1. In another example, in some embodiments of the invention, the communications apparatus may further comprise a central controller coupled to the modem 120 and the application processor 130. Therefore, the invention should not be limited to what is shown in FIG. 1.

In some embodiments of the invention, the communications apparatus is capable of supporting multiple radio access technologies (RATs) communications via the single-card structure as shown in FIG. 1. It should be noted that, although FIG. 1 shows a single-card application, the invention should not be limited thereto. For example, in some embodiments of the invention, the communications apparatus may comprise multiple subscriber identity cards to support the multi-RATs communications, in either a single-standby or a multiple-standby manner. In the multi-RATs communications applications, the modem, the radio transceiver and/or the antenna module may be shared by the subscriber identity card(s) and may have the capability of handling the operations of different RATs and processing the corresponding RF, IF or baseband signals in compliance with the corresponding communications protocols.

In addition, those who are skilled in this technology can still make various alterations and modifications based on the descriptions given above to derive the communications apparatuses comprising multiple radio transceivers and/or multiple antenna modules for supporting multi-RAT wireless communications without departing from the scope and spirit of this invention. Therefore, in some embodiments of the invention, the communications apparatus may be designed to support a multi-card application, in either a single-standby or a multiple-standby manner, by making some alterations and modifications.

It should be further noted that the subscriber identity card 140 may be dedicated hardware cards as described above, or in some embodiments of the invention, there may be individual identifiers, numbers, addresses, or the like which are burned in the internal memory device of the corresponding modem and are capable of identifying the communications apparatus. Therefore, the invention should not be limited to what is shown in the figures.

It should be further noted that in some embodiments of the invention, the communications apparatus may further support multiple IMSIs.

Figure 2:
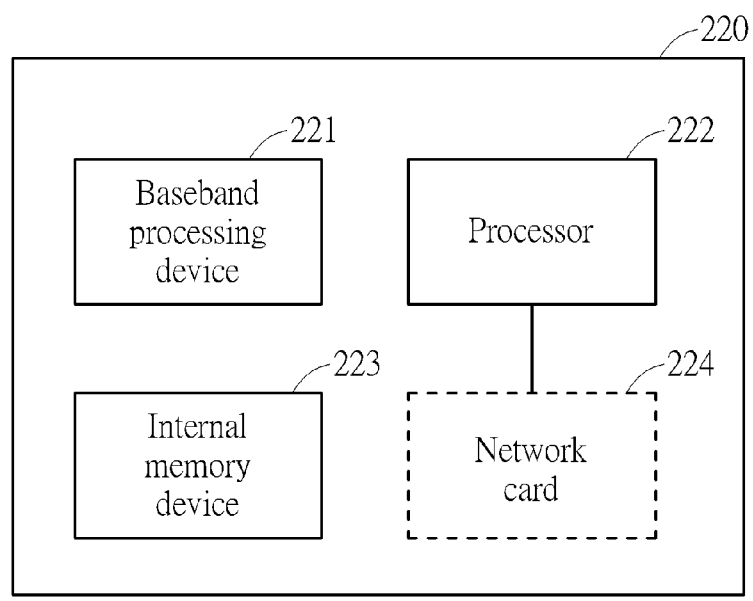
FIG. 2 shows an exemplary block diagram of a modem according to an embodiment of the invention.

FIG. 2 shows an exemplary block diagram of a modem according to an embodiment of the invention. The modem 220 may be the modem 120 shown in FIG. 1 and may comprise at least a baseband processing device 221, a processor 222, an internal memory device 223 and a network card 224. The baseband processing device 221 may receive the IF or baseband signals from the radio transceiver 110 and perform IF or baseband signal processing. For example, the baseband processing device 221 may convert the IF or baseband signals into a plurality of digital signals, and process the digital signals, and vice versa. The baseband processing device 221 may comprise a plurality of hardware devices to perform signal processing, such as an analog-to-digital converter for ADC conversion, a digital-to-analog converter for DAC conversion, an amplifier for gain adjustment, a modulator for signal modulation, a demodulator for signal demodulation, an encoder for signal encoding, a decoder for signal decoding, and so on.

According to an embodiment of the invention, the baseband processing device 221 may be designed to have the capability of handling the baseband signal processing operations for different RATs and processing the corresponding IF or baseband signals in compliance with the corresponding communications protocols, so as to support the multi-RAT wireless communications. According to another embodiment of the invention, the baseband processing device 221 may comprise a plurality of sub-units, each being designed to have the capability of handling the baseband signal processing operations of one or more specific RATs and processing the corresponding IF or baseband signals in compliance with the corresponding communications protocols, so as to support the multi-RAT wireless communications. Therefore, the invention should not be limited to any specific way of implementation.

The processor 222 may control the operations of the modem 220. According to an embodiment of the invention, the processor 222 may be arranged to execute the program codes of the corresponding software module of the modem 220. The processor 222 may maintain and execute the individual tasks, threads, and/or protocol stacks for different software modules. In an embodiment, a protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

The processor 222 may also read data from the subscriber identity card coupled to the modem, such as the subscriber identity card 140, and write data to the subscriber identity card. The internal memory device 223 may store system data and user data for the modem 220. The processor 222 may also access the internal memory device 223.

The network card 224 provides Internet access services for the communications apparatus. It should be noted that, although the network card 224 shown in FIG. 2 is configured inside of the modem, the invention should not be limited thereto. In some embodiments of the invention, the communications apparatus may also comprise a network card configured outside of the modem, or the communications apparatus may also be coupled to an external network card for providing Internet access services. In some embodiments of the invention, the network card 224 may be a virtual network card, instead of a tangible card, that is created by the operating system of the communications apparatus 100. Therefore, the invention should not be limited to any specific implementation method.

It should be noted that, in order to clarify the concept of the invention, FIG. 2 presents simplified block diagrams in which only the elements relevant to the invention are shown. Therefore, the invention should not be limited to what is shown in FIG. 2.

It should be further noted that in some embodiments of the invention, the modem may also comprise more than one processor and/or more than one baseband processing device. For example, the modem may comprise multiple processors and/or multiple baseband processing devices for supporting multi-RAT operations. Therefore, the invention should not be limited to what is shown in FIG. 2.

It should be further noted that in some embodiments of the invention, the baseband processing device 221 and the processor 222 may be integrated into one processing unit, and the modem may comprise one or multiple such processing units, for supporting multi-RAT operations. Therefore, the invention should not be limited to what is shown in FIG. 2.

As discussed above, 5G NR system is designed to operate at millimeter-wave (mmWave) frequencies. 3GPP NR supports measurement on channel state information reference signal (CSI-RS) for beam measurement (BM), and the CSI-RS resources can be periodic, semi-persistent, or aperiodic. Transmission Configuration Indicator (TCI) states are dynamically sent over in a Downlink Control Information (DCI) message which includes configurations such as Quasi Co-Location (QCL)-relationships between one or two downlink reference signals and the DeModulation Reference Signal (DM-RS) ports of the Physical Downlink Shared Channel (PDSCH), the DM-RS port of Physical Downlink Control Channel (PDSCH) or the CSI-RS port(s) of a CSI-RS resource. For example, the TCI state associates one or two downlink reference signals with a corresponding QCL type.

Generally, TCI states for periodic or aperiodic non-zero power (NZP) CSI-RS resources are preconfigured as Radio Resource Control (RRC) parameters per component carrier (CC). However, there may be a lot of CCs configured for a UE. For example, the number of configured CCs may be up to 32. The large number of configured CCs may cause a huge overhead of beam management to the UE when the UE has to receive the TCI states or updated TCI states separately for each CC.

To solve the aforementioned problem and to perform beam management more efficiently, a novel beam management method for simultaneous updating the TCI state among multiple CCs is provided.

According to an embodiment of the invention, a new parameter (for example, am RRC parameter) which indicates a list of CC(s) for TCI state update for NZP CSI-RS resource across CCs. The new parameter may be presented as a predetermined CC list. When the communications apparatus 100 (for example, the UE) receives the TCI state of a NZP CSI-RS resource in a CC, the communications apparatus 100 may apply the beam setting indicated by the TCI state to the CC(s) in the predetermined CC list. In this manner, simultaneous updating the TCI state among multiple CCs is achieved and the beam management may be performed more efficiently.

To be more specific, according to an embodiment of the invention, the predetermined CC list may record identifiers (IDs) of one or more CCs which is/are selected to share the same receiving (RX) beam parameters, for simultaneous updating the TCI state. In addition, the processor 222 (or, the communications apparatus 100) may determine a recommended CC list listing one or more CCs for simultaneous updating the TCI state and provide information regarding the recommended CC list to the network device (for example, the gNB). The final decision of which CC should be added into the predetermined CC list may be made by the network device, for example, the network device may select one or more CCs to be added into the predetermined CC list based on the recommended CC list provided by the communications apparatus 100, and the network device may provide information regarding the predetermined CC list or the aforementioned new parameter to the communications apparatus 100 by transmitting a predetermined message or signaling.

Figure 3:
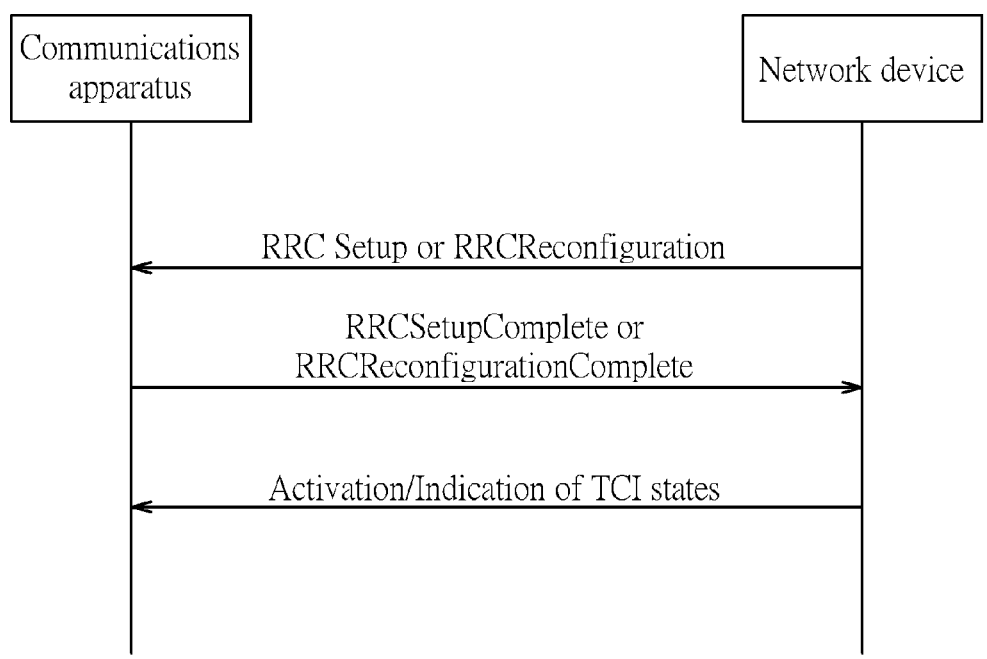
FIG. 3 shows an exemplary message flow between communications apparatus and the network device for providing information regarding the proposed new parameter according to an embodiment of the invention.

FIG. 3 shows an exemplary message flow between communications apparatus 100 and the network device, such as the gNB, for providing information regarding the proposed new parameter according to an embodiment of the invention. As discussed above, the communications apparatus 100 may determine a recommended CC list and provide information regarding the recommended CC list to the network device. The recommended CC list may be provided to the gNB by UE capability. When the final decision of the predetermined CC list is made, the network device may transmit a predetermined message or signaling carrying information regarding the predetermined CC list to the communications apparatus 100. According to an embodiment of the invention, the predetermined message or signaling may be an RRC message, for example but not limited to, an RRC Setup message or an RRCReconfiguration message. Upon receiving the predetermined message or signaling carrying information regarding the predetermined CC list, the communications apparatus 100 may store the information regarding the predetermined CC list in the memory device 150 or 223 and respond to the network device by transmitting an RRCSetupComplete message or an RRCReconfigurationComplete message. After the information regarding the predetermined CC list has been provided to the communications apparatus 100, the predetermined CC list may be used when the communications apparatus 100 receives a signaling of Medium Access Control (MAC) Control Element (CE) (for example, for semi-persistent (SP) CSI-RS) or an RRC message (for example, for periodic and aperiodic CSI-RS) of activation or indication of TCI states.

According to an embodiment of the invention, when the communications apparatus 100 receives the TCI state of a NZP CSI-RS resource in a CC, the communications apparatus 100 may apply the setting (for example, the same Rx beam) indicated by a predetermined QCL type RS in RRC parameter(s) or MAC CE to all NZP CSI-RS resources with the same NZP CSI-RS resource ID in the CCs which belong to the predetermined CC list provided by the new RRC parameter.

The proposed new parameter and beam management method can be applied to all of the periodic, semi-persistent, and aperiodic CSI-RS resource.

For periodic CSI-RS, the QCL source of periodic CSI-RS is included in a NZP-CSI-RS Resource, such as specified in the qcl-InfoPeriodicCSI-RS field of the NZP-CSI-RS Resource. The qcl-InfoPeriodicCSI-RS field may contain a reference to one TCI-RS-SetConfig in TCI states for a target periodic CSI-RS. The NZP-CSI-RS Resource may be identified by a corresponding resource identifier (ID), such as the ID recorded in the NZP-CSI-RS-Resourceid field. The NZP-CSI-RS Resource may be one of a plurality of NZP-CSI-RS resources configured for a CC, such as a serving cell. Therefore, information regarding the TCI state for a target periodic CSI-RS may be retrieved from the qcl-InfoPeriodicCSI-RS field of a NZP-CSI-RS Resource configured for a CC. For more details of the periodic CSI-RS Resource, reference may be made to 3GPP TS 38.331.

For semi-persistent (SP) CSI-RS, the SP CSI-RS resource set is activated/deactivated through MAC-CE. When the resource set is activated, TCI state IDs for each NZP CSI-RS resource is provided. Individual TCI state for individual resources may be specified in the activated resource set. The SP CSI-RS resource set ID(s) of identifies the SP CSI-RS resource set(s) configured for a CC, and the corresponding TCI state ID(s) may be specified in the corresponding configuration. For more details of the SP CSI-RS Resource, reference may be made to 3GPP TS 38.331.

For aperiodic CSI-RS, the TCI state (for example, the RRC parameter qcl-info) for an aperiodic CSI-RS resource is provided in the configuration of resourceForChannel in the information structure CSI-AssociatedReportedConfig-Info. For more details of the aperiodic CSI-RS Resource, reference may be made to 3GPP TS 38.331.

For each CSI-RS resource in a NZP CSI-RS resourceset, the beam information (for example, the corresponding TCI state) is provided in the corresponding configuration as introduced above. In addition, as an example, the NZP-CSI-RS Resource ID: NZP-CSI-RS-ResourceSetId is provided in CSI resource configuration: CSI-ResourceConfig and each CSI resource configuration is associated with a CSI report configuration: CSI-ReportConfig. Both the sets of CSI resource configuration and CSI report configuration is provided in a CSI measurement configuration: CSI-MeasConfig which is included in a serving cell configuration: Serving-CellConfig. Therefore, TCI states for periodic or aperiodic NZP CSI-RS resources are preconfigured as RRC parameters (qcl-InfoPeriodicCSI-RS or qcl-info) per CC (such as the serving cell), and TCI states for semi-persistent NZP CSI-RS resource is provided by SP CSI-RS/CSI-IM (Interference Measurement) Resource Set Activation/Deactivation MAC CE which includes the serving cell ID.

According to an embodiment of the invention, when the communications apparatus 100 is indicated the QCL configuration of QCL RS source(s) and QCL type(s), through higher layer signaling (RRC parameters or MAC CE) which contains a list of references to TCI-State's for the CSI-RS resources for a CC, the communications apparatus 100 may apply the same spatial receiver parameters which was used for receiving those QCL type RSs to one or more CCs recorded in the predetermined CC list.

Figure 4:
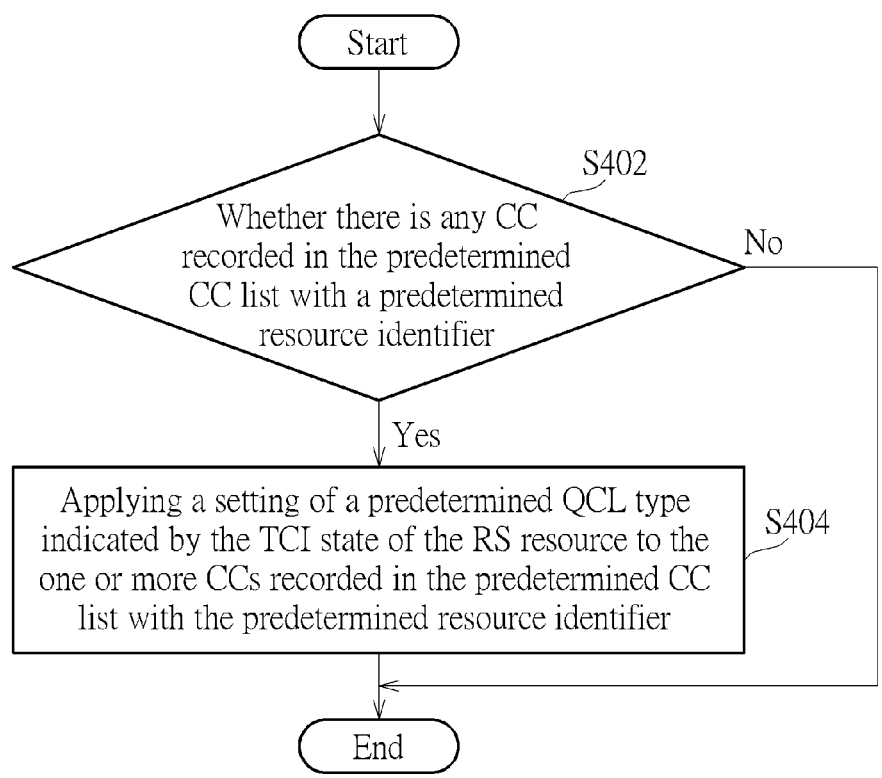
FIG. 4 shows an exemplary flow chart of the proposed beam management method according to an embodiment of the invention.

FIG. 4 shows an exemplary flow chart of the proposed beam management method according to an embodiment of the invention. The beam management flow may be started upon receiving information regarding a TCI state of a reference signal (RS) resource in a target CC (for example, upon receiving the corresponding signaling or message of activation or indication of TCI states or update of TCI states), and may comprise the following steps performed by the processor 222:

Step S402: determining whether there is any CC recorded in the predetermined CC list with a predetermined resource ID that is the same as the resource ID of the RS resource associated with the TCI state. If yes, the step S404 is performed. If no, the flow is ended.

Step S404: applying a setting of a predetermined QCL type indicated by the TCI state of the RS resource to the one or more CCs recorded in the predetermined CC list with the predetermined resource identifier.

As discussed above, the predetermined CC list records IDs of one or more CCs sharing the same receiving (RX) beam parameters and/or for simultaneous updating the TCI state. In addition, the RS resource in step S402 may be a NZP CSI-RS resource with a NZP CSI-RS resource ID, and in response to reception of the TCI state information of the RS resource, the resource ID of the CC recorded in the predetermined CC list is inspected and compared with the aforementioned NZP CSI-RS resource ID, so as to find out one or more CCs with the predetermined resource ID that is the same as the aforementioned NZP CSI-RS resource ID in step S402.

According to an embodiment of the invention, simultaneous updating the TCI state among multiple CCs is achieved in step S404. In addition, according to an embodiment of the invention, the predetermined QCL type is QCL typeD.

Figure 5:
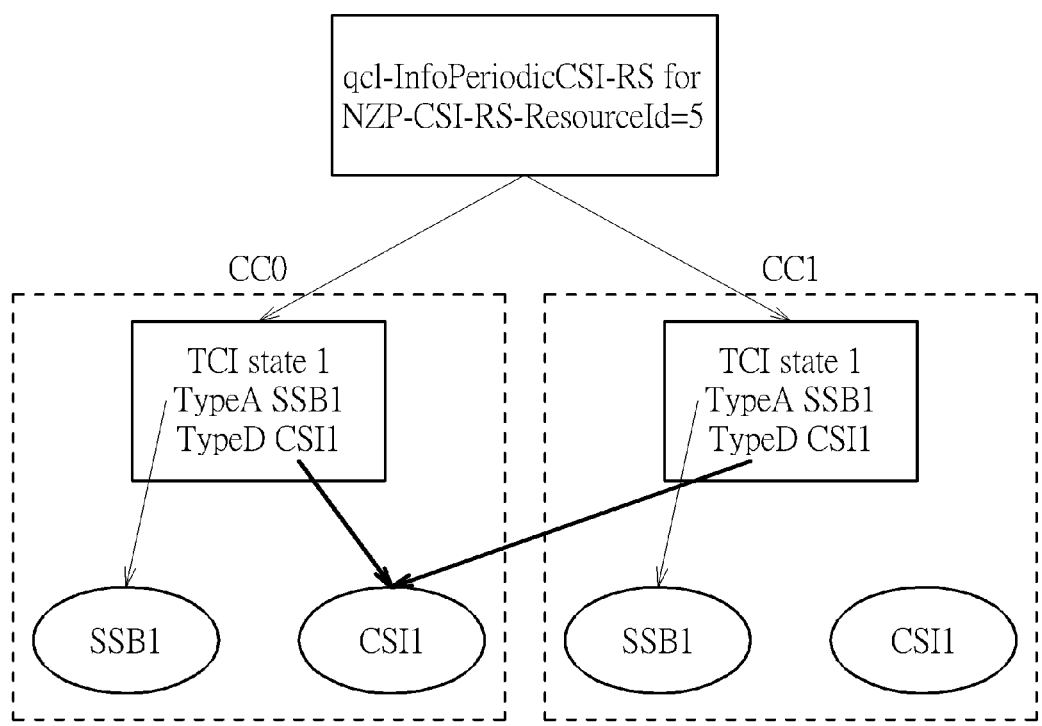
FIG. 5 is a schematic diagram showing a beam management example according to an embodiment of the invention.

FIG. 5 is a schematic diagram showing a beam management example implemented based on the proposed beam management method to update TCI state for NZP CSI-RS resource across CCs according to an embodiment of the invention. Suppose there are two CCs recorded in the predetermined CC list: CCListTCIstateNZP-CSI-RS-AcrossCC={CC0, CC1}.

When the communications apparatus 100 is provided with qcl-InfoPeriodicCSI-RS (for periodic CSI-RS, or qcl-info for aperiodic NZP CSI-RS)=TCI state 1 for a NZP CSI-RS resource with NZP-CSI-RS-ResourceId=5 in CC0, the communications apparatus 100 applies this setting as in shown in FIG. 5.

Suppose that TCI state 1 indicates QCL typeA as Synchronization Signal Block (SSB) with ID=1 (the SSB1 as shown in FIG. 5) and QCL typeD as a CSI-RS resource with ID=1 (the CSI1 as shown in FIG. 5). Each QCL typeA RS of TCI state 1 in each CC indicates SSB1 in corresponding CC. That is, the setting of QCL typeA RS of TCI state is not simultaneous updated among CCs.

In addition, both QCL typeD RSs (for example, which may indicate the UE's Rx spatial filter) in each CC indicate the same CSI RS in CC0. In this example, the communications apparatus 100 applies the same Rx spatial filter which was used for receiving a CSI-RS resource with ID=1 in CC0 to both NZP CSI-RS resources with ID=5 in CC0 and CC1. Note that the resource IDs are defined per CC and the processor 222 is able to find the same resource ID in each CC.

Therefore, as the thick arrows shown in FIG. 5, the setting indicated by QCL-typeD RS of the TCI state of the NZP CSI-RS resources with ID=5 in CC0 is shared among the CCs CC0 and CC1 in the predetermined CC list. In this manner, settings indicated by a predetermined QCL type RS of the TCI state of the NZP CSI-RS resources with the same ID are simultaneous updated across the CCs in the predetermined CC list.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for beam management for a communications apparatus communicating with a network device in a wireless network, comprising:

in response to receiving information regarding a Transmission Configuration Indicator (TCI) state of a reference signal (RS) resource in a target component carrier (CC), determining whether a CC recorded in a predetermined CC list has a predetermined resource identifier that is same as a resource identifier associated with the TCI state; and in response to the CC recorded in the predetermined CC list having the predetermined resource identifier that is same as the resource identifier associated with the TCI state, applying a setting of a predetermined Quasi Co-Location (QCL) type indicated by the TCI state to the CC recorded in the predetermined CC list.

2. The method of claim 1, further comprising:
receiving the predetermined CC list from the network device; and
storing information regarding the predetermined CC list in a memory device of the communications apparatus.

3. The method of claim 1, wherein the predetermined CC list records identifiers of one or more CCs sharing the same receiving (RX) beam parameters.

4. The method of claim 1, wherein the predetermined CC list records identifiers of one or more CCs for simultaneous updating the TCI state.

5. The method of claim 1, wherein the RS resource is a non-zero power (NZP) channel state information reference signal (CSI-RS) resource, the TCI state is provided for the RS resource with a NZP CSI-RS resource ID, and the predetermined resource identifier of the one or more CCs is the same as the NZP CSI-RS resource ID of the NZP CSI-RS resource.

6. The method of claim 1, further comprising:
determining a recommended CC list listing one or more CCs for simultaneous updating the TCI state; and
providing information regarding the recommended CC list to the network device.

7. The method of claim 1, wherein the predetermined QCL type is QCL typeD.

8. A communications apparatus, comprising:
a radio transceiver, transmitting or receiving wireless signals in a wireless network; and
a processor, coupled to the radio transceiver and configured to perform operations comprising:
in response to receiving information regarding a Transmission Configuration Indicator (TCI) state of a reference signal (RS) resource in a target component carrier (CC), determining whether a CC recorded in a predetermined CC list has a predetermined resource identifier that is same as a resource identifier associated with the TCI state; and in response to the CC recorded in the predetermined CC list having the predetermined resource identifier that is same as the resource identifier associated with the TCI state, applying a setting of a predetermined Quasi Co-Location (QCL) type indicated by the TCI state of the RS resource in the target CC to the CC recorded in the predetermined CC list.

9. The communications apparatus of claim 8, further comprising:
a memory device, storing information regarding the predetermined CC list, wherein the predetermined CC list is received from a network device in the wireless network.

10. The communications apparatus of claim 8, wherein the predetermined CC list records identifiers of one or more CCs sharing the same receiving (RX) beam parameters.

11. The communications apparatus of claim 8, wherein the predetermined CC list records identifiers of one or more CCs list for simultaneous updating the TCI state.

12. The communications apparatus of claim 8, wherein the RS resource is a non-zero power (NZP) channel state information reference signal (CSI-RS) resource, the TCI state is provided for the RS resource with a NZP CSI-RS resource ID, and the predetermined resource identifier of the one or more CCs is the same as the NZP CSI-RS resource ID of the NZP CSI-RS resource.

13. The communications apparatus of claim 8, wherein the processor is further configured to perform operations comprising:
determining a recommended CC list listing one or more CCs for simultaneous updating the TCI state; and
providing information regarding the recommended CC list to a network device in the wireless network.

14. The communications apparatus of claim 8, wherein the predetermined QCL type is QCL typeD.

* * * * *